(12) United States Patent
Zirkiyev et al.

(10) Patent No.: US 8,955,763 B2
(45) Date of Patent: Feb. 17, 2015

(54) BUILDING HEATING SYSTEM AND METHOD OF OPERATION

(75) Inventors: Simkho Zirkiyev, Rego Park, NY (US); Charles Carroll Copeland, Hastings on Hudson, NY (US); John D. Leffler, New York, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 2114 days.

(21) Appl. No.: 11/867,249

(22) Filed: Oct. 4, 2007

(65) Prior Publication Data

US 2009/0090789 A1 Apr. 9, 2009

(51) Int. Cl.
*F24D 3/00* (2006.01)
*G05D 23/19* (2006.01)
*F24D 10/00* (2006.01)
*F24D 19/10* (2006.01)
*F16K 17/38* (2006.01)
*F24D 1/00* (2006.01)

(52) U.S. Cl.
CPC ............ *G05D 23/1923* (2013.01); *F24D 10/00* (2013.01); *F24D 19/1003* (2013.01); *F24D 1/00* (2013.01); *Y02B 30/16* (2013.01); *Y02E 20/14* (2013.01)
USPC .............. 237/8 A; 237/2 A; 237/9 R; 237/13; 237/59; 137/2; 137/78.1; 137/78.5; 137/624.11

(58) Field of Classification Search
CPC ............... F24D 3/02; F24D 3/00; F24D 7/00; F23N 2041/02; F23N 5/02; B01D 1/0082; G05D 7/00; G05D 23/00
USPC .................. 137/2, 78.1, 78.5, 79, 80, 624.11; 237/2 A, 2 R, 7, 8 A, 8 R, 9 R, 12, 13, 67, 237/68, 56, 69, 62
IPC .................................................. F24D 3/02,3/00
See application file for complete search history.

(56) References Cited

U.S. PATENT DOCUMENTS

| | | | | |
|---|---|---|---|---|
| 1,555,338 | A * | 9/1925 | Vaughan | 392/449 |
| 2,030,544 | A * | 2/1936 | Ross | 237/9 R |
| 2,083,612 | A * | 6/1937 | Midyette, Jr. | 236/1 E |
| 2,257,471 | A * | 9/1941 | McGrath | 236/91 R |
| 2,257,485 | A * | 9/1941 | Sewell | 236/44 C |
| 2,273,260 | A * | 2/1942 | Guler | 236/46 R |
| 2,778,571 | A * | 1/1957 | Gaddis | 236/46 R |
| 3,144,548 | A * | 8/1964 | Seigel | 219/505 |
| 3,193,000 | A * | 7/1965 | Bressoud | 165/249 |
| 3,779,306 | A | 12/1973 | Wilson | |
| 3,890,787 | A * | 6/1975 | Margen | 60/648 |
| 4,187,982 | A * | 2/1980 | Laing et al. | 237/2 B |
| 4,337,893 | A * | 7/1982 | Flanders et al. | 237/7 |

(Continued)

FOREIGN PATENT DOCUMENTS

EP 548389 A1 * 6/1993 .............. F24D 3/02

*Primary Examiner* — Kang Hu
*Assistant Examiner* — Daniel E Namay
(74) *Attorney, Agent, or Firm* — Cantor Colburn LLP (57) ABSTRACT

A system and method for operating a building heating system. The system includes a controller that operates the heating system in three modes of operation. The controller controls a valve that regulates the flow of steam to the building water loop. By maintaining a constant steam flow rate during peak demand periods, steam consumption during peak demand periods are reduced while maintaining a comfortable environment within the building.

8 Claims, 9 Drawing Sheets

(56) References Cited

U.S. PATENT DOCUMENTS

| | | | |
|---|---|---|---|
| 4,370,723 A * | 1/1983 | Huffman et al. | 700/295 |
| 4,445,023 A | 4/1984 | McKenney | |
| 4,527,246 A * | 7/1985 | Masson | 700/300 |
| 4,532,984 A | 8/1985 | Smith, Jr. | |
| 4,557,417 A * | 12/1985 | Ruby | 236/46 R |
| 4,595,046 A * | 6/1986 | Iino | 165/299 |
| 4,665,709 A * | 5/1987 | Perry | 62/141 |
| 4,671,457 A * | 6/1987 | Berkhof | 236/46 R |
| 4,782,888 A * | 11/1988 | Bardenheier | 165/210 |
| 4,898,231 A | 2/1990 | Miyazaki | |
| 4,921,163 A * | 5/1990 | Viessmann | 236/46 R |
| 4,987,839 A * | 1/1991 | Krigmont et al. | 95/2 |
| 5,029,535 A * | 7/1991 | Krigmont et al. | 110/345 |
| 5,294,051 A * | 3/1994 | Piegari | 237/8 R |
| 5,347,825 A * | 9/1994 | Krist | 62/179 |
| 5,556,027 A * | 9/1996 | Fiedrich | 237/8 C |
| 5,617,994 A * | 4/1997 | Fiedrich | 237/8 R |
| 5,772,113 A * | 6/1998 | Gerstmann et al. | 237/8 R |
| 5,779,143 A * | 7/1998 | Michaud et al. | 237/8 R |
| 5,971,063 A * | 10/1999 | Treppler | 165/110 |
| 6,035,932 A | 3/2000 | Goeler et al. | |
| 6,041,617 A | 3/2000 | Sanada et al. | |
| 6,073,448 A | 6/2000 | Lozada | |
| 6,112,574 A * | 9/2000 | Hirano et al. | 73/23.31 |
| 6,182,749 B1 | 2/2001 | Brost et al. | |
| 6,299,071 B1 * | 10/2001 | Fiedrich | 237/8 R |
| 6,390,183 B2 | 5/2002 | Aoyagi et al. | |
| 6,454,179 B1 * | 9/2002 | Neve et al. | 237/2 A |
| 6,609,564 B2 | 8/2003 | Imaoka et al. | |
| 6,647,302 B2 * | 11/2003 | Pouchak | 700/83 |
| 6,745,085 B2 * | 6/2004 | Pouchak | 700/21 |
| 6,813,631 B2 * | 11/2004 | Pouchak et al. | 709/203 |
| 6,857,467 B2 | 2/2005 | Lach | |
| 7,698,074 B1 * | 4/2010 | Cybulski | 702/32 |
| 7,706,990 B2 * | 4/2010 | Herzig | 702/62 |
| 2004/0112585 A1 | 6/2004 | Goodson et al. | |
| 2005/0034467 A1 | 2/2005 | Varney | |
| 2005/0161521 A1 * | 7/2005 | Guyer | 237/12.1 |
| 2006/0243222 A1 * | 11/2006 | Moskwa et al. | 122/4 R |
| 2007/0295830 A1 * | 12/2007 | Cohen et al. | 237/8 A |
| 2008/0314337 A1 * | 12/2008 | Teti | 122/14.1 |
| 2009/0048719 A1 * | 2/2009 | McLaughlin et al. | 700/299 |

\* cited by examiner

BUILDING HEATING SYSTEM AND METHOD OF OPERATION

BACKGROUND OF THE INVENTION

The present invention relates generally to a system for controlling the use of steam within a building and more particularly to a system that can control the flow of steam to minimize peak demand.

In large metropolitan areas, it is not uncommon for a central boiler system to be used to generate heat for multiple facilities in the surrounding area. This heating system is sometimes referred to as district heating or teleheating. The steam is transported via insulated pipes to subscribing buildings, which purchase the steam from the steam utility. Similar to an electric meter, a steam meter measures the amount of steam used by a particular building and the building owner is charged on a periodic basis.

In some areas it has grown expensive or impractical to add more capacity to the existing steam generation and distribution system. For example, real estate prices may make the properties in the area more valuable as an office building rather than a steam generation plant. As demand grows, the capability of the steam utility to provide necessary amount of steam may be strained. This capacity gap is most evident during the peak times of the year.

The steam distribution system is typically designed for peak demand periods. Unfortunately, the peak demand is only for several hours each year, typically on a cold weekday morning. Since many buildings are not used at night steam usage is low. In the morning, the building heating systems are started up resulting in an increase in demand for steam. Since most buildings start to increase temperatures at a similar time, the demand problem becomes compounded.

By designing to the peak demand periods, the steam generation and distribution system has excess capacity for large portions of the year. To encourage customers to conserve steam and reduce usage at peak times, steam utilities have implemented "net-metering" programs that charge customers different rates depending on not only how much steam they use, but also based on when the steam is used. Typically, a peak-demand charge is based on the highest demand from the customer during any thirty minute period during peak hours. Thus, customers who can reduce their usage during the early part of the work day pay less for their steam. If many of the steam utility customers adopt this manner of operation, then the steam utility can add additional customers without adding capacity. This way, more customers share the same expense, keeping the cost of steam stable in the long term.

While existing steam based building heating systems are suitable for their intended purposes, there still remains a need for improvements particularly regarding the reduction of peak demand in a manner that makes more efficient use of the existing steam distribution system while providing desired heating conditions for the customer.

SUMMARY OF THE INVENTION

A controller for a building heating system is disclosed herein. The controller includes at least one output. Controller further includes a means for operating in a first mode of operation during a first part of a day and a second mode of operation during a second part of the day. A means for transmitting a first signal through at least one output. The signal is indicative of a valve setting to increase a water loop temperature to a high limit. A means for transmitting a second signal is included indicating a valve setting based on a constant rate of heat input.

A system for controlling a building heating system is disclosed herein. The system includes a heat medium loop. A valve is coupled to the heat medium loop. A water loop is thermally coupled to the heat medium loop downstream from the valve. A controller is electrically or pneumatically coupled to the valve. The controller includes a means for operating the valve in a first mode based on increasing a water loop temperature to a high limit and a means for operating the valve in a second mode based on the control of flow of heat medium based on a constant rate of heat input.

A building heating system is also disclosed herein. The heating system includes a heat medium source and a plurality of zones coupled to the heat medium source. Each of the zones is coupled to the heat medium source by a valve. A water loop is thermally coupled to the valve and a thermal heating unit. A controller having means for operating the zone valves in a first mode that controls based on increasing a water loop temperature to a high limit and a second mode that controls the flow of the heat medium based on a constant rate of heat input.

BRIEF DESCRIPTION OF THE DRAWINGS

Referring now to the drawings, which are meant to be exemplary and not limiting, and wherein like elements are numbered alike.

DETAILED DESCRIPTION

Figure 1:
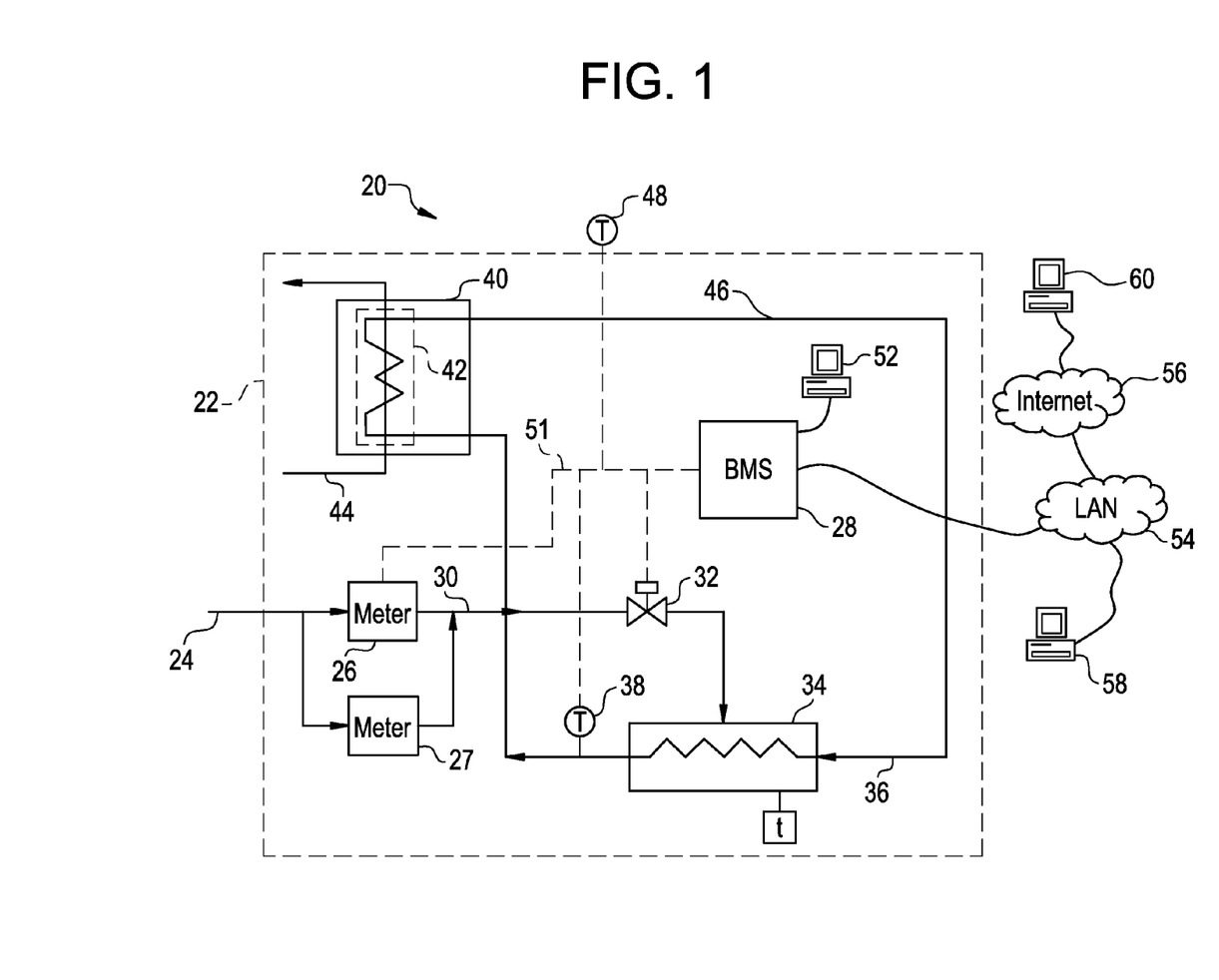
FIG. 1 is a schematic illustration of a building heating system in accordance with an embodiment of the building heating system.

FIG. 1 illustrates an exemplary embodiment of a building heating system 20 for building 22. A steam inlet 24 enters the building 22 and is connected to a steam meter 26 that measures the amount of steam entering the building 22. The meter 26 is connected to a building management system 28 ("BMS") which provides a centralized control for the building heating system 20. The meter 26 may be of any suitable type of meter, a mass flow meter for example, that is capable of measuring the amount of steam entering the building. Meter 26 may also have optional communication or visual interfaces that allows the steam utility to obtain data on how much steam is used by the building 22. Meter 26 may also be comprised of two or more optional meters 27 connected in parallel for increased metering accuracy. If there is more than one meter, the output of all the meters may be totalized by the BMS to monitor one steam flow signal. In the exemplary embodiment, the meter 26 is also capable of monitoring steam usage over time to allow the steam utility to charge based on peak and off-peak demand usage.

The steam flows through conduit 30 to a valve 32. It should be appreciated that steam pipe 30 may be coupled to other devices (not shown) such as but not limited to relief valves, check valves, manifolds, pressure regulators and the like. Steam pipe 30 may also serve as a connection to other steam consuming systems, including but not limited to air handling units and steam-driven chillers. A pressure regulator, for example, may be utilized to reduce the pressure from the distribution system to a lower pressure that may be utilized by the heating system 20. The valve 32 controls the flow of steam from steam pipe 30 to the heat exchanger 34. In the exemplary embodiment, the valve 32 is a powered valve, such as a flow control valve for example, that is capable of being operated remotely by the BMS 28 between a fully closed and a fully open position or any point therebetween allowing the flow rate of steam entering the heat exchanger 34 to be controlled. The valve 32 is coupled to the BMS 28 to receive control commands from the BMS 28.

The heat exchanger 34 thermally couples the steam from inlet 24 to the hot water loop 36. The water loop 36 receives heat from the steam via heat exchanger 34. Heat exchanger 34 may any suitable type, a shell and tube or a heat plate exchanger for example, that is used for transferring thermal energy. A temperature sensor 38 monitors the water loop 36 temperature down-stream from the heat exchanger 34. The temperature sensor communicates the BMS 28 to provide the BMS 28 with data indicating the temperature of the water in water loop 36. The water loop 36 continues past the temperature sensor 38 and is coupled with one or more thermal heating units 40. It should be appreciated that only a single thermal heating unit 40 is shown for exemplary purposes and that water loop 36 may be coupled to a number of such thermal heating units 40. A second temperature sensor 48 is connected to BMS 28 to provide a signal indicating the outside ambient air temperature.

The thermal heating unit 40 is the system within building 22 that provides heat to the occupied spaces within building 22. In the exemplary embodiment, the thermal heating unit 40 draws air 44 from a room through a heat exchanger 42. The heat exchanger may be any suitable type, a plate or fin heat exchanger for example. As air moves from the inlet of the heat exchanger 42 to the outlet of the thermal heating unit 40, the air is heated before being returned to the room. Thermal heating unit 40 is controlled in the space being heated, typically by a thermostat mounted either on the thermal heating unit 40 or within the occupied space. While the exemplary embodiment illustrates an air-type thermal heating unit 40, other types maybe suitable used as well, such as but not limited to induction units, fan coil units, fan-powered boxes, or any other thermal heating unit with local thermostat control and that uses hot water. Water in the water loop 36 exits the thermal heating unit 40 at a lower temperature and returns to the heat exchanger 34 via conduit 46.

Figure 2:
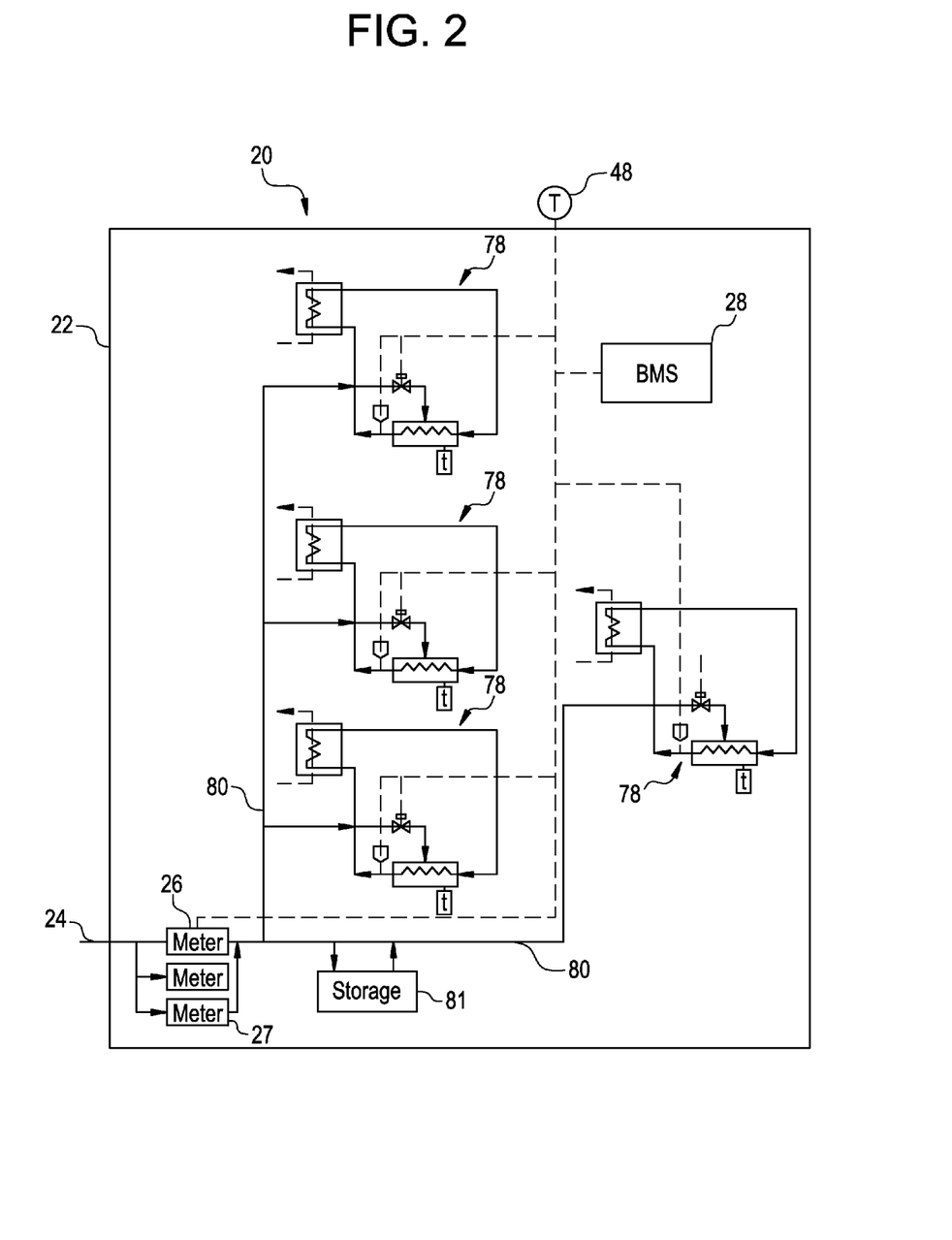
FIG. 2 is a schematic illustration of a building heating system containing multiple heating units.

An alternate embodiment building heating system 20 is illustrated in FIG. 2. In this embodiment, the building 22 includes a number of zones 78, each of which has their own heat exchanger 34, water loop 36 and thermal heating units 40. This embodiment would typically be found in a high-rise type building where heating loads may vary with direction of a building's exposure and elevation within the building. The steam meter 26 monitors the flow of steam from the inlet 24 and passes the steam to a manifold 80 that passes distributes the steam to individual zones 78. The BMS 28 is coupled to communicate with each of the zones 78 in the same manner as that described with respect to the embodiment of FIG. 1. For example, each zone 78 may be equivalent or compare to the building heating system 20 shown in FIG. 1. Accordingly, references to elements of FIG. 1 may also be incorporated into the zones 78 of FIG. 2.

The building heating system 20 operation is controlled by BMS 28. The BMS may be any suitable control device capable of receiving multiple inputs and providing control functionality to multiple devices based on the inputs. BMS 28 includes a controller 50 (FIG. 3) which is a suitable electronic device capable of accepting data and instructions, executing the instructions to process the data, and presenting the results. Controller 50 may accept instructions through user interface 26, or through other means such as but not limited to electronic data card, voice activation means, manually-operable selection and control means, radiated wavelength and electronic or electrical transfer. Therefore, controller 50 can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a scientific calculator, or a hybrid of any of the foregoing.

Controller 50 is capable of converting the analog voltage or current level provided by sensors 38, 48 and meter 26 into a digital signal indicative of the water loop 36 temperature and ambient outside air temperature. Alternatively, sensors 38, 48 and meter 26 may be configured to provide a digital signal to controller 50, or an analog-to-digital (A/D) converter maybe coupled between sensors 38, 48 and controller 50 to convert the analog signal provided by sensors 38, 48 and meter 26 into a digital signal for processing by controller 50. Alternatively, controller 50 may convert pulse signals from meter 26 to a digital signal. Controller 50 uses the digital signals to act as inputs input to various processes for controlling the building heating system 20. The digital signals represent one or more system 20 data including but not limited to steam meter usage, temperatures, pressures, thermal heating unit 40 set points, water loop 36 high set point temperature and low set point temperature.

Controller 50 is operably coupled with one or more components of heating system 20 by data transmission media 51. Data transmission media 51 includes, but is not limited to, twisted pair wiring, coaxial cable, and fiber optic cable. Data transmission media 51 also includes, but is not limited to, wireless, radio and infrared signal transmission systems. In the embodiment shown in FIG. 1, transmission media 51 couples controller 50 to valve 32, steam meter 26, water loop temperature sensor 38, and ambient outside air temperature sensor 48. Controller 50 is configured to provide operating signals to these components and to receive data from these components via data transmission media 51.

The data received from sensors 38, 48, steam meter 26 and valve 32 may be displayed on user interface 52, which is coupled to controller 50. User interface 52 is an LED (light-emitting diode) display, an LCD (liquid-crystal diode) display, a CRT (cathode ray tube) display, or the like. A keypad is coupled to user interface 52 for providing data input to controller 50.

In addition to being coupled to one or more components within heating system 20, controller 50 may also be coupled to external computer networks such as a local area network (LAN) 54 and the Internet 56. LAN 54 interconnects one or more remote computers 58, which are configured to communicate with controller 50 using a well-known computer communications protocol such as TCP/IP (Transmission Control Protocol/Internet Protocol), RS-232, ModBus, and the like. Additional heating systems 20 may also be connected to LAN 54 with the controllers 50 in each of these heating systems 20 being configured to send and receive data to and from remote computers 58 and other heating systems 20. LAN 54 is connected to the Internet 56. This connection allows controller 50 to communicate with one or more remote computers 60 connected to the Internet 56.

Figure 3:
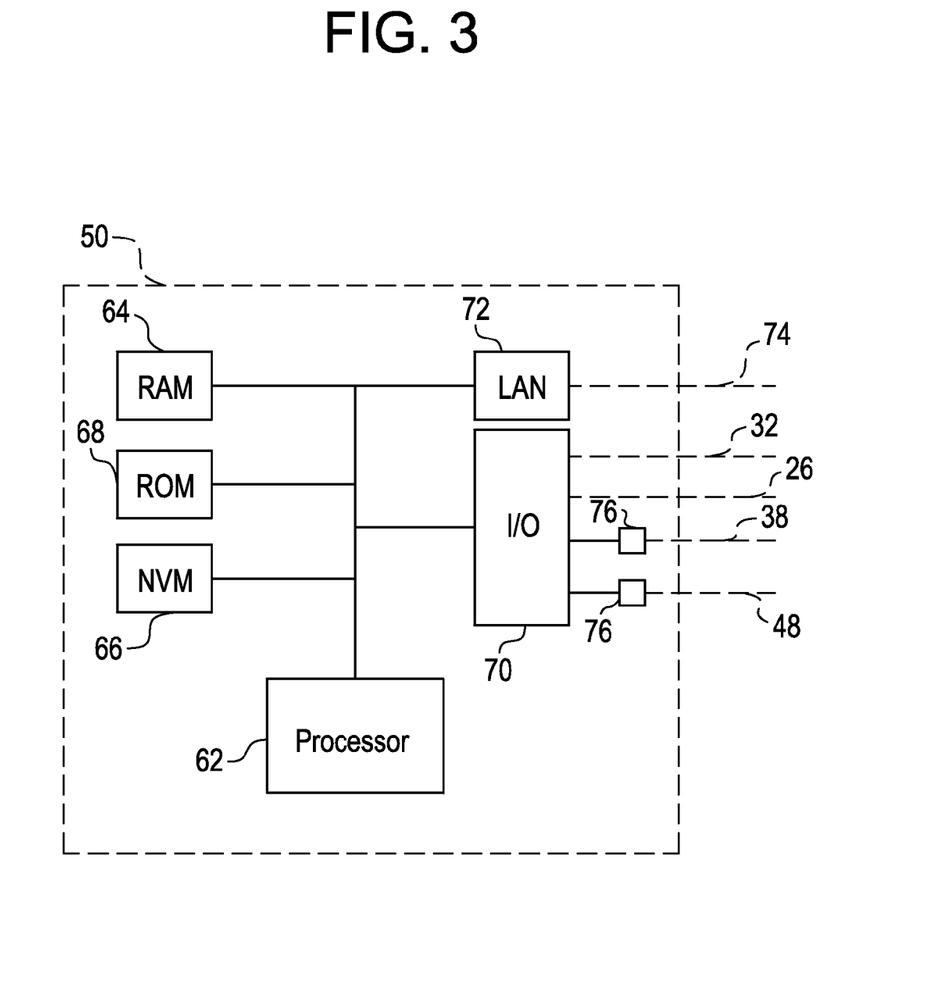
FIG. 3 is a schematic illustration of an embodiment of the controller used in the building heating system of FIG. 1.

Referring now to FIG. 3, a schematic diagram of controller 50 is shown. Controller 50 includes a processor 62 coupled to a random access memory (RAM) device 64, a non-volatile memory (NVM) device 66, a read-only memory (ROM) device 68, one or more input/output (I/O) controllers 70, and a LAN interface device 72 via a data communications bus 74.

I/O controllers 70 are coupled to steam meter 26, sensors 38, 48, valve 32, and user interface 52 for providing digital data between these devices and bus 74. I/O controllers 70 are also coupled to analog-to-digital (A/D) converters 76, which receive analog data signals from sensors 38, 48 and a pulse to digital converter or an A/D converter, which receives a signal from meter 26.

LAN interface device 72 provides for communication between controller 50 and LAN 54 in a data communications protocol supported by LAN 54. ROM device 68 stores an application code, e.g., main functionality firmware, including initializing parameters, and boot code, for processor 62. Application code also includes program instructions for causing processor 62 to execute any heating system operation control methods, including starting and stopping operation, monitoring predetermined operating parameters such as water loop temperature, ambient outside temperature and generation of alarms. The information to be exchanged remote computers and the controller 50 include but are not limited to heating system 20 status, current heat demand, water loop temperature, thermal heating unit 40 status, current meter 26 flow data, cumulative meter 26 flow data, valve 32 status, and alarm status.

NVM device 66 is any form of non-volatile memory such as an EPROM (Erasable Programmable Read Only Memory) chip, a disk drive, or the like. Stored in NVM device 66 are various operational parameters for the application code. The various operational parameters can be input to NVM device 66 either locally, using user interface 52 or remote computer 58, or remotely via the Internet using remote computer 60. It will be recognized that application code can be stored in NVM device 66 rather than ROM device 68.

Controller 50 includes operation control methods embodied in application code. These methods are embodied in computer instructions written to be executed by processor 62, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Controller 50 accepts data from valve 32, sensors 38, 48 and steam meter 26, is given certain instructions for the purpose of comparing the data from valve 32, sensors 38, 48 and steam meter 26 to predetermined parameters. Controller 50 provides operating signals to valve 32. Controller 50 also accepts data from temperature sensor 38, indicating, for example, whether the water loop 36 is operating in the correct temperature range. The controller 50 compares the operational parameters to predetermined variances (for example, high temperature range) and if the predetermined variance is exceeded, generates a signal that may be used to initiate control methods that adapt the operation of the heating system 20 to compensate for the out of variance operating parameter. For example, as will be discussed in more detail below, a high water loop 36 temperature may indicate that demand from thermal heating unit 40 has fallen. To ensure that proper operations and comfort conditions are not compromised, the controller 50 may close valve 32 to let the temperature in the loop to drop by preventing additional steam from entering the heat exchanger 34.

Figure 4:
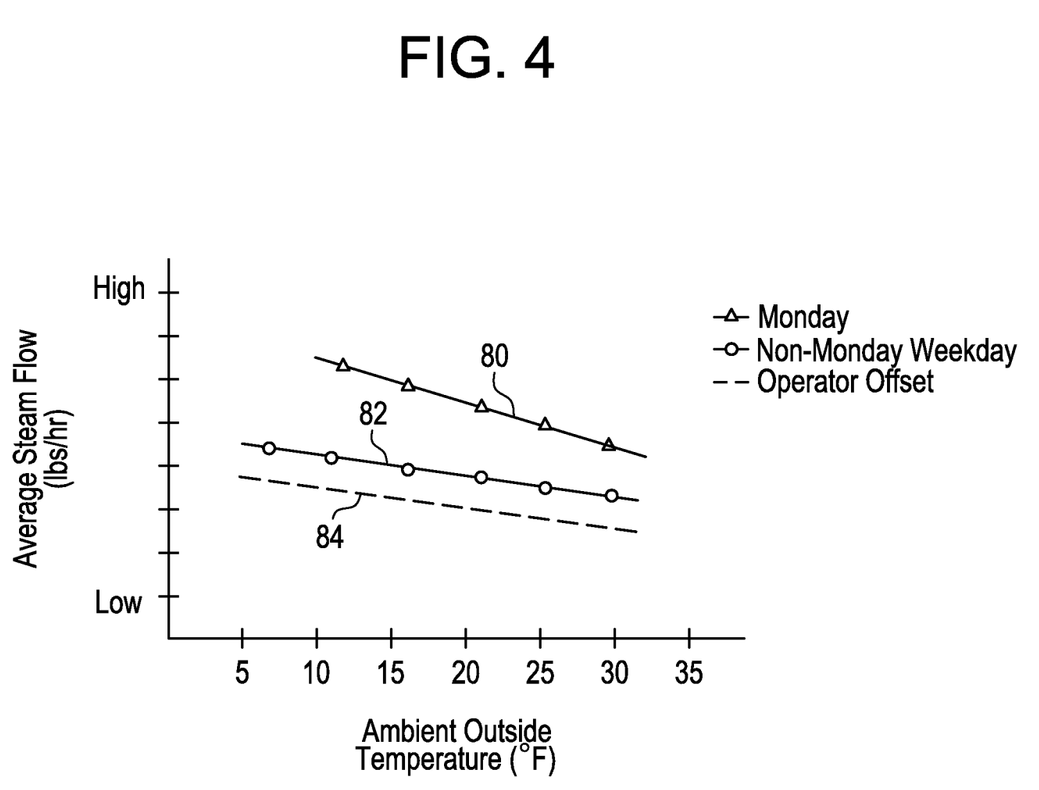
FIG. 4 is an illustration of average steam flow and ambient temperature curves for the building heating system of FIG. 1.

During operation, the steam flow into a building is not constant. The relationship between average steam flow into building 22 and the ambient outside temperature are illustrated in FIG. 4. As the outdoor temperature starts to decrease, the required amount of steam flow will increase. However, it should be noted that a given building 22 may have different relationships depending on the type of operations residing in the facility. The relationships shown in FIG. 4 are typical of an office building that is mainly populated during the weekdays. To save on energy costs on the weekend, building heating systems use just enough steam to prevent freezing of the coils. Since the building has cooled over the weekend, the steam requirements for Monday morning 80 are higher than the remainder of the weekdays 82. As will be described in more detail below, the utilization of the heating system 20 allows the building operator to program in an offset 84, or for the BMS to calculate one automatically, to reduce steam usage during peak demand periods.

The operation of the heating system 20 can be described as having three phases of operation depending on the time of day, and the day of the week. For a commercial office building, the weekdays are the periods when there is the most activity and when the occupants would require heat to maintain a comfortable working environment. The weekends, in contrast, are periods of low heat demand due to a lack of activity, therefore, it is likely that the demand from the building, and the demand on the steam utility is lower. Therefore, it is demands required of the steam utility during the weekdays that are likely to drive capacity requirements. To minimize demand utilization during peak loading times, the heating system 20 has three states of operation during the week.

The first period, typically during the early morning hours is referred to herein as heat storage mode. During this time period, which typically occurs during the middle of the night several hours before switching to the second period of flow control mode discussed below. During this first period, the temperature of the water loop is slowly increased to the maximum temperature limit. In the exemplary embodiment, the first period starts at 4 AM and the temperature of the water loop is slowly increased to avoid additional demand charges from the utility. Since this time period is generally one of low demand for the utility, customers can increase the water loop 36 temperature without straining the utility's existing distribution system. As will be described in more detail below, increasing the temperature of the water loop 36 causes heat to be stored within the water loop 36. This stored heat is later extracted to minimize steam usage during peak load times. Alternatively, heat may also be stored in a storage device 81, including but not limited to a water tank or a rock tank to provide extra capacity. It should be appreciated that the option storage device 81 may be connected downstream of the meter prior to any manifolds that distribute the steam, or alternatively may be connected to the circulating hot water loops. During heat storage mode, the operation of the terminal units (i.e. induction units, fan coil units, fan powered boxes, etc.) may vary from building to building. Specifically, the fans may or may not be turned on, depending on the specific characteristics of the mechanical systems in the building.

The second period of operation corresponds to the peak steam load time, typically between 6 AM and 10 AM in the morning. This is the time period when the building's occupants (or their automated thermostats) increase the temperature setting in the occupied spaces to prepare the space for use. Since many buildings are increasing the set temperature in the same general time period, the demand for steam from the utility also increases greatly. It is this time period that drives the capacity requirements of the utility. Since the heating system 20 has stored heat internal to the building 22 within the water loop 36, the heating system 20 may reduce its steam usage by extracting the stored heat rather than increasing the flow of steam into the building 22. This second mode of operation is referred to herein as flow control mode. In flow control, the valve 32 is operated by the BMS 28 to a constant rate of heat input, or in the case of a steam system for example a constant steam flow rate, rather than based on the temperature of the water loop 36. Controlling the flow rate of steam is advantageous since it allows the heat stored in the building 22 to be slowly extracted from the water loop 36 over the high demand period. Without controlling the flow of steam (e.g. remaining in Temperature Control mode discussed below), the stored heat would be rapidly depleted from the water loop 36 resulting in higher demands on the steam utility.

The third period of operation is referred to herein as temperature control mode. This mode of operation takes place between the flow control period and the heat storage period. In Temperature control mode, the valve 32 is modulated by the BMS 28 to maintain the water loop 36 at set point temperature, which may be constant or may vary. As the thermal heating units 40 extract heat from the water loop 36, heat is added into the water loop 36 by increasing steam flow to the heat exchanger 34. The BMS 28 continuously modulates the valve 32 during this time period to maintain the water loop 36 at a set point temperature. Temperature Control mode is the mode in which prior art heating systems operate in continuously.

Figure 5:
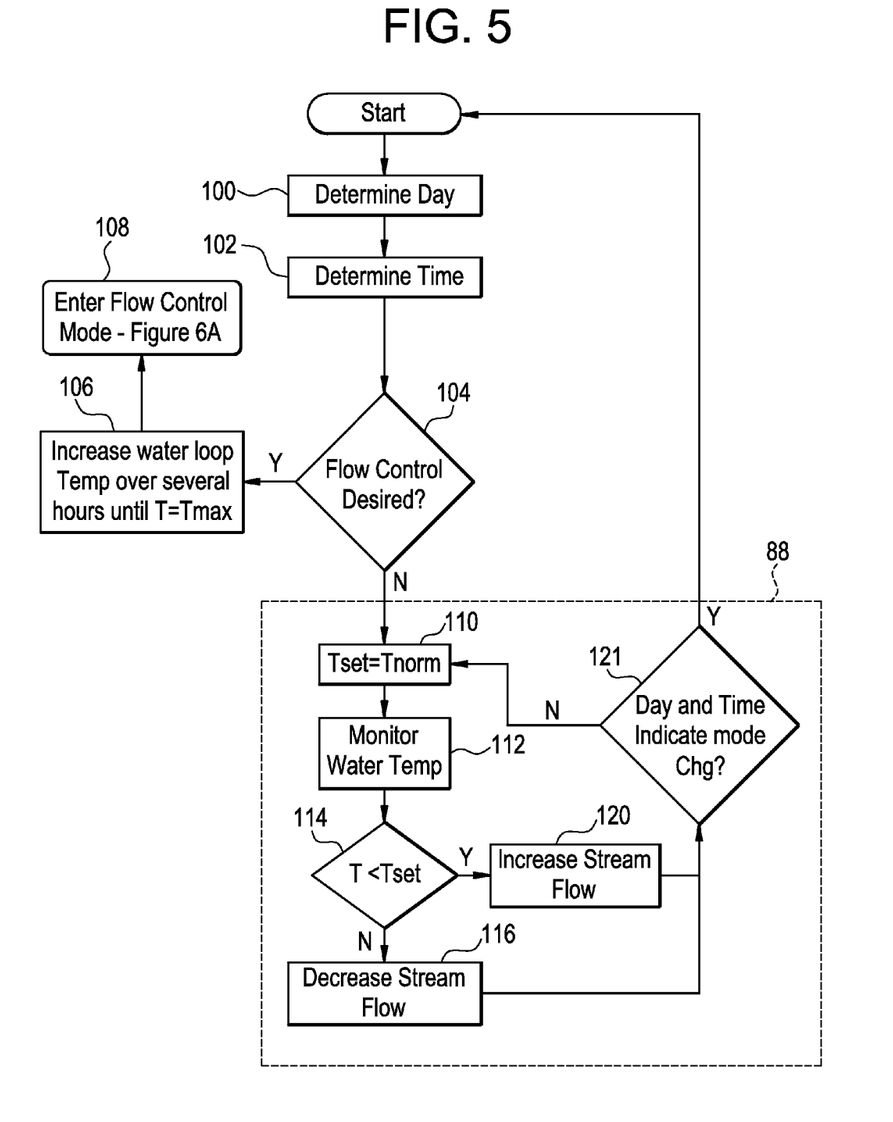
FIG. 5 is a flow diagram of a control system operation in temperature control modes of operation.
Figure 6A:
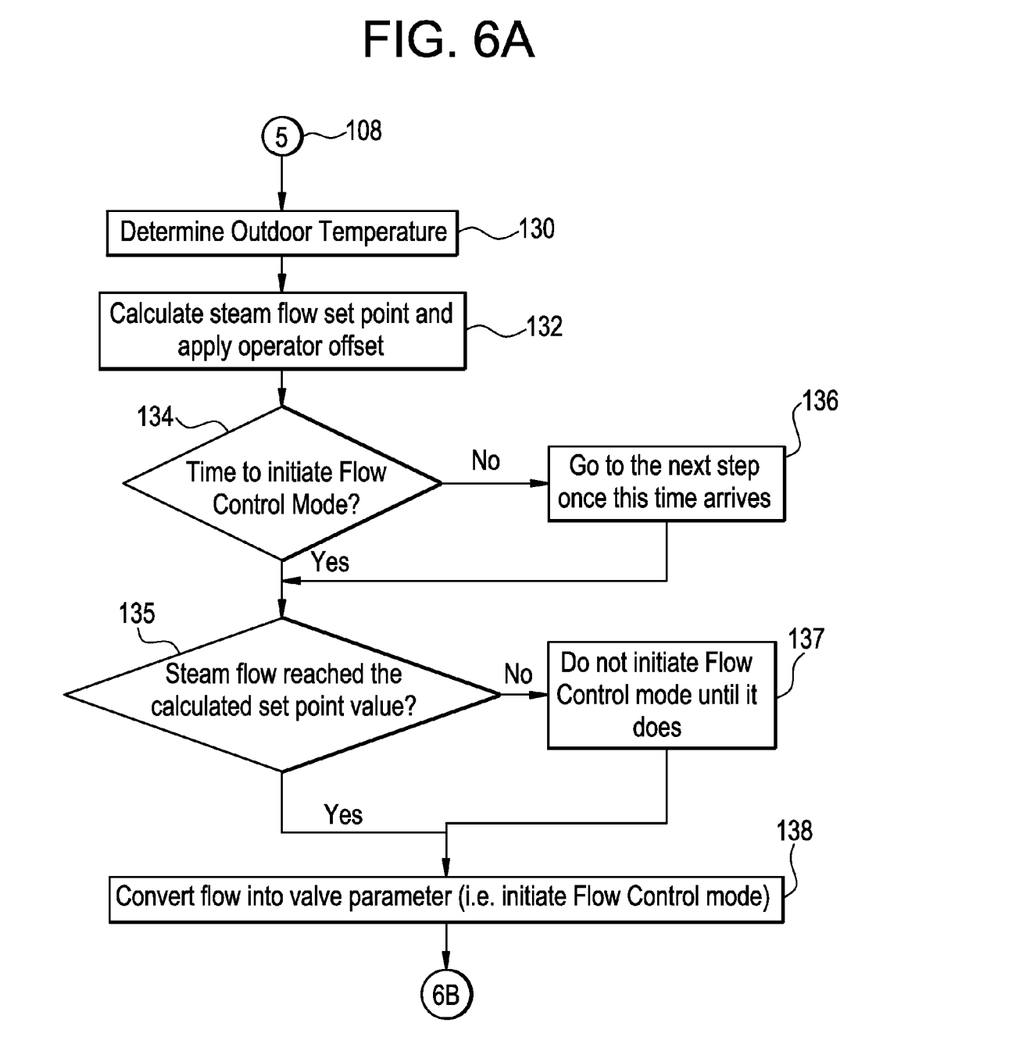
FIG. 6A is a flow diagram of a control system operation in flow control mode of operation.

The three modes of operation, heat storage mode, flow control mode, and temperature control mode are embodied in flow charts illustrated in FIG. 5 and FIG. 6. These modes of operation are the operational states of the controller 50 and heating system 20 during the different modes of operation. Movement between states occurs when one or more of the underlying conditions, such as time or day, change. These changes may occur in a system level or within an individual circulating hot water loop. During weekday operation, such as that shown in FIG. 7, controller 50 operates between at least some of the operational states.

The BMS 28 includes a controller 50 that periodically determines if the day of the week and time of day indicate a change in the mode of operation for heat system 20 should occur. As discussed above, heating system 20 will usually operate in one of several modes of operation, a temperature control and heat storage state 88, and a flow control state 90. Temperature control and heat storage state 88 are similar in operation, except with different temperature set points. FIG. 5 illustrates a flow chart depicting the functions of controller 50 while in the temperature control state 88 which is the normal mode of operation for the heat system 20.

As shown in FIG. 5, controller 50 first determines the day and time in steps 100, 102. As discussed above, the manner of operation of heating system 20 depends on the day and time. The exemplary embodiments discussed herein are what would be considered for a typical commercial office building. However, facilities that hold other types of activities could benefit from the heating system 20 except that the hours and days in which the heating system 20 changes states would be different. For example, in a commercial office building, the normal business hours with high activity would be from 8 AM to 6 PM. The points in time during the day when the heating system 20 changes states would typically be determined by the building operator. Using the commercial office building again as an example, the heating system 20 would be switched about 6 AM to a mode that prepares the building to be occupied.

After determining the time and day, the controller 50 determines in step 104 if the building operator desires to enter the flow control mode. If the query returns an affirmative response, the controller 50 proceeds to step 106 and enters heat storage mode of operation. Heat storage is a process by which the heating system 20 gradually increases the water temperature in water loop 36 to its maximum allowable temperature over a period of several hours. If heat storage is desired, between 12 AM and 6 AM for example, the set temperature (Tset) is gradually increased over several hours until it reaches the maximum temperature limit (Tmax) in step 106. In the exemplary embodiment, Tmax is set to 180° F. After the appropriate temperature has been reached, controller 50 moves into flow control mode 108 as will be described in more detail below with reference to FIGS. 6A-6C.

If flow control is not desired, it is after 10 AM and before 12 AM for example, the controller 50 next proceeds into temperature control state 88. The set temperature is set to the desired operation temperature (Tnorm) in step 110. In the exemplary embodiment, the normal operation temperature is 120° F. The controller 50 then monitors the water temperature of water loop 36 in step 112 to determine if additional actions need to be taken. The first query in step 114 checks to determine if current water loop 36 temperature (T) is less than the set temperature (Tset). If the query returns a negative, the valve 32 is modulated to a closed position in step 116. Alternatively, the orifice or opening in the valve 32 may be modulated to restricted or reduce the flow of steam. By closing the valve 32, steam is prevented from reaching, or at minimum flow is reduced, to the heat exchanger 34 and there should be no further increases in the water loop 36 temperature. After closing the valve 32, the controller 50 proceeds to step 121.

If the response to query 114 is positive, the next step, the controller 50 signals, in step 120, the valve 32 to increase the rate of steam flow to the heat exchanger 34. By increasing the steam flow through valve 32, the temperature of the heat exchanger also increases thereby raising the water loop 36 temperature. It should be appreciated that the controller 50 may be programmed to allow a band of operation around the temperature set point where the steam flow would remain constant to avoid unnecessary cycling of the valve 32. If the day or time indicates a change in the mode of operation, the controller 50 loops back in step 121 to start of the process, otherwise the temperature control mode continues in step 110.

When the controller 50 determines that, based on the day and time, that flow control is desired, the controller transitions to flow control mode at step 108. Controller 50 first determines in step 130 the current outside ambient air temperature. The temperature data may be acquired directly, as through the temperature sensor 48 in the exemplary embodiment, or alternatively, the temperature may be communicated to the controller via LAN 54. After acquiring the ambient air temperature, the required steam flow set point is calculated in step 132. In the exemplary embodiment, the flow rate is determined using the relationships illustrated in FIG. 4 by using the ambient outside temperature to determine the desired flow rate. The controller 50 may accomplish this step either through a look-up-table, providing a discrete value for ranges of temperatures, or by programming the equations of lines 80, 82, 84 into the controller 50 to provide a continuous range of values.

Controller 50 may also determine if the building operator desires an offset in step 132. An offset, which corresponds to line 84 in FIG. 4, allows a building operator to induce further savings by reducing the steam flow. Depending on the particular operations and construction of a building, the operator may find that due to the storage of heat in water loop 36, the average steam flow rate may be reduced while still providing the desired levels of heat within the occupied spaces. For example, an operator of an older building containing more metal piping will be able to store more heat within the water loop 36 that lowers the average steam flow rate required to maintain a comfortable environment. If the offset is desired, controller 50 calculates the final flow rate set point value based on the offset in step 132.

The controller 50 next determines if it is an appropriate time to enter into steam flow control mode in step 134, at 6 AM for example. If it is not the appropriate time, the controller 50 enters a wait state 136 until the appropriate time is reached. Once it is the appropriate time of the day to control steam flow, the controller 50 determines in step 135 if the current steam flow entering the building 22 is less than the steam flow set point (including any offset, if appropriate). If the current steam flow requirement is less than the set point, the controller 50 waits in step 137 until the current steam flow reaches the steam flow set point.

The controller 50 converts the flow rate into a valve parameter in step 138 and the valve parameter is transmitted to the valve 32. The valve parameter is a value corresponding to a valve opening that results in the desired flow rate. This value will change depending on the actual valve installed in a building. For example, a particular valve may provide a flow rate when fully open of 50,000 lb/hr. If for example, a 25,000 lb/hr flow rate is desired, the valve parameter transmitted to the valve 32 would instruct the valve 32 to open 50%. It should be appreciated that the valve parameters may not be linear and that each individual valve may need configured or tuned to accurately control the total steam flow rate into the building. Alternatively, the valve may be controlled using a temperature feedback loop where the temperature of the water loop is used as a control parameter to provide a constant or nearly constant flow rate.

Figure 6B:
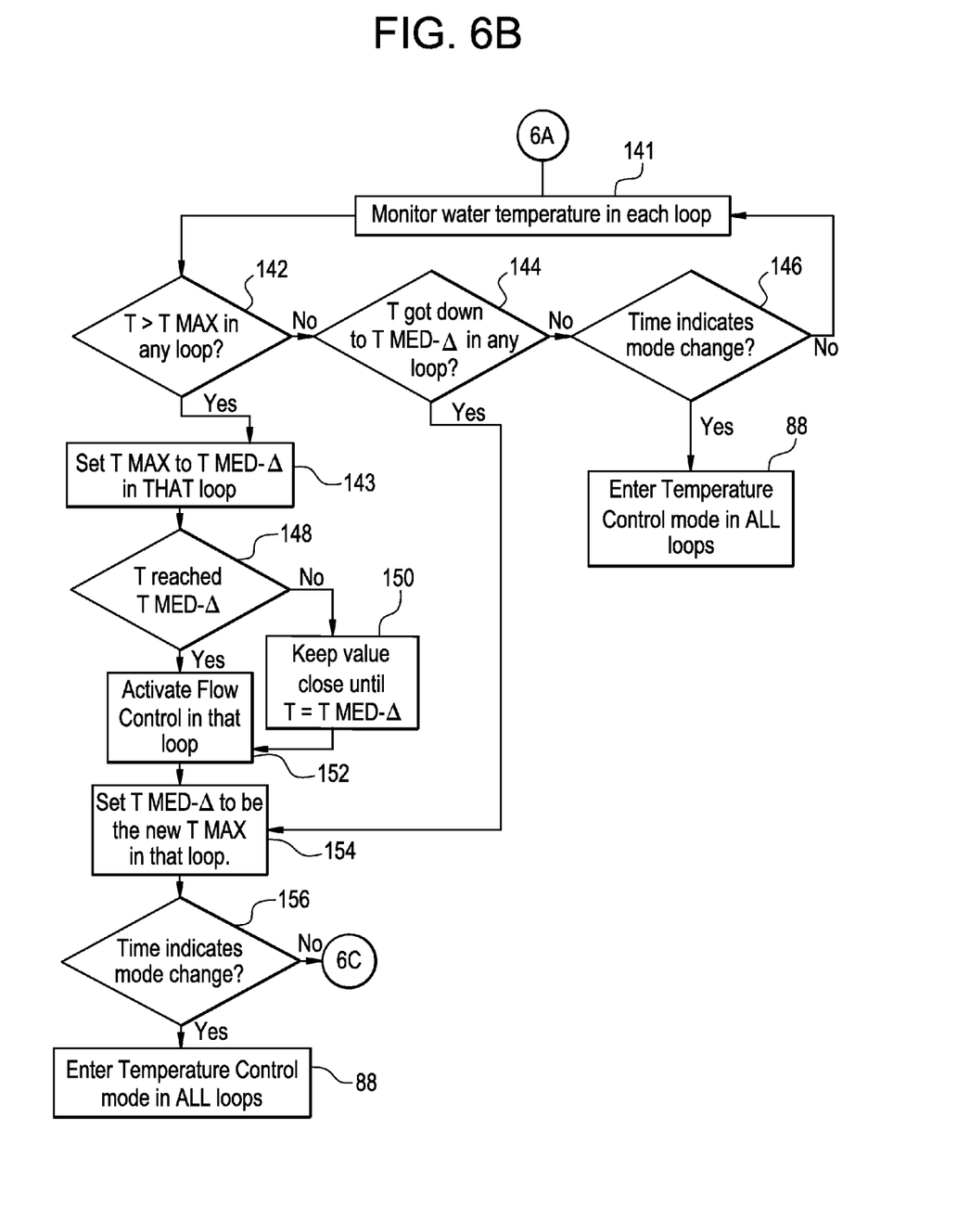
FIG. 6B is a flow diagram of a portion of the control system operation in flow control mode of operation.

The temperature of water loop 36 is monitored to determine that it remains within limits set by the operator as shown in FIG. 6B. Controller 50 first queries in step 142 to determine if the temperature (T) of water loop 36 is greater than the maximum temperature limit (Tmax). This may occur for example, if the heat requirements of the occupied space are unexpectedly low, or, if the offset 84 is too small. If the query 142 returns a negative, meaning the temperature is within the operating range, the controller 50 proceeds on to step 144. It should be appreciated that the discussion with reference to the water loop 36 is also inclusive of each water loop in the building 22 when the building 22 has multiple water loops and that the water temperature and the process described below may be monitored and controlled within each loop.

As the heating system 20 operates in flow control mode, the temperature of the water loop 36 will decrease over time as the thermal energy stored in the water loop 36 is extracted and utilized within the building 22. In step 144, the water loop temperature is compared against a medium temperature (Tmed) set by the operator. If the water loop temperature is equal to Tmed, the controller 50 proceeds to step 154 discussed below. If the water loop temperature is greater than the medium temperature, the controller determines in step 146 if the time of day indicates a desired change in the mode of operation, it is 11 AM for example. If the query 146 indicates a positive, the controller proceeds to temperature control mode 88 for all water loops in the building 22. If the query 146 returns a negative, the controller 50 loops back to step 141 and continues to monitor the water loop 36 temperature.

If step 142 determines that the water loop 36 temperature in a loop is greater than the maximum temperature limit (Tmax), the controller proceeds to step 143 where Tmax is set to $T_{med-\Delta}$ in that water loop 36. $T_{med-\Delta}$ is an operator-specified temperature that is 5° F. to 15° F. less than $T_{med}$, but greater than the low temperature limit (Tlow). The water loop 36 temperature is queried in step 148 to determine if the water loop temperature (T) is less than $T_{med-\Delta}$. If the response to the query is no, the valve 32 for that water loop 36 remains closed in step 150 until the water loop temperature is equal to $T_{med-\Delta}$.

Figure 6C:
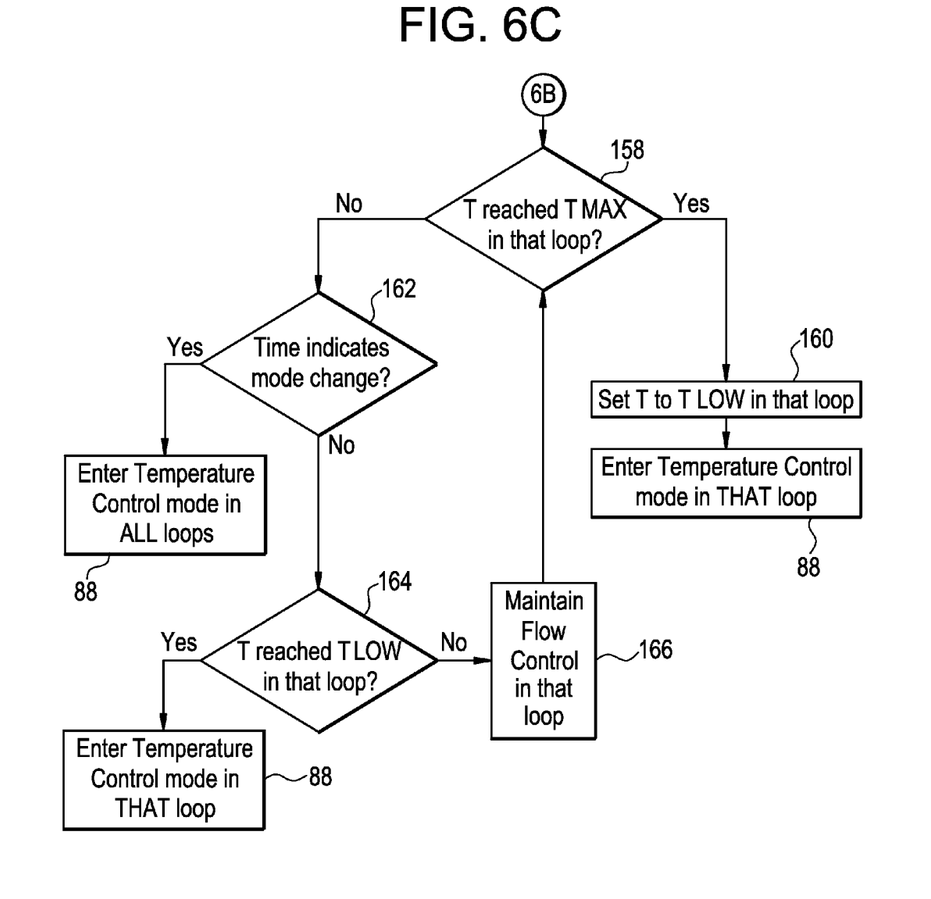
FIG. 6C is a flow diagram of a portion of the control system operation in flow control mode of operation.

Once the water loop temperature is equal to $T_{med-\Delta}$, the controller proceeds to step 152 to once again convert the building steam flow rate into a valve parameter and transmit the valve parameter to the valve 32 in that water loop. First, in step 154, the parameter Tmax is reset to equal Tmed. The controller queries to determine if it is an appropriate time to exit flow control mode in step 156. If the query returns a positive, the controller proceeds to temperature control mode 88 for all water loops in the building 22. As shown in FIG. 6C, if the time of day indicates that flow control is still desired, the controller 50 determines if the temperature of the water loop has increased to Tmax in step 158. If the query returns a positive, the controller proceeds in step 160 to set the set temperature Tset equal to a parameter Tlow which is less than Tmax. The controller 50 then proceeds to operate that particular loop in a temperature control mode 88.

If query 158 returns a negative, the controller 50 checks in step 162 if a the time of day indicates a change in the mode of operation. If the query returns a positive, all the water loops 36 in the building 22 enter temperature control mode 88. If a mode change is not required, the controller queries to determines if the water loop temperature has reached a low temperature limit in step 164. A positive response to the query indicates that the particular water loop 36 may have additional heating requirements, so for that particular water loop 36, the controller enters into temperature control mode 88. For any water loops 36 that have a water temperature above Tlow, the controller 50 maintains the operation in flow control mode as indicated in step 166. The controller 50 continues to loop through flow control mode in steps 158-166 while the water loop temperature remains between Tlow and Tmax.

In embodiments where multiple heating zones 78 are located within a building 22, such as that illustrated in FIG. 2, additional functionalities and advantages may be incorporated into heating system 20. It is contemplated that when multiple zones 78 are utilized, that BMS 28 will instruct each of the valves in the zones to have the same position at a given time. This will facilitate control of steam flow rate into the building by minimizing the possibility of valve hunting or swinging. However, it is also contemplated that the BMS 28 may bias the amount of opening of one or more valves serving zones 78 that may require additional heat capacity due to their location, on the north side of the building for example. With a bias, the BMS 28 will still modulate all the valves in unison during system operation, but it will keep the biased valves more (or less) open than the remaining valves. For example, if the BMS 28 is sending a 70% open master signal to all valves and there is a bias of +10% on the loop located on the northern side of the building, the BMS 28 will send a signal of 80% open to that valve.

One situation that may arise in a building having multiple zones 78 is where one of the zones 78 reaches the high temperature set point. This situation may occur, for example, if the internal loads in the zone are higher than they are in other zones (possibly due to presence of more people and computers). In this circumstance, the BMS 28 would close the valve 32 in the zone 78 where the high temperature set point was reached to avoid unnecessary usage of steam. The BMS 28 would proceed to modulate in unison the valves in each of the other zones 78 to maintain a constant steam flow into the building 22.

Figure 7:
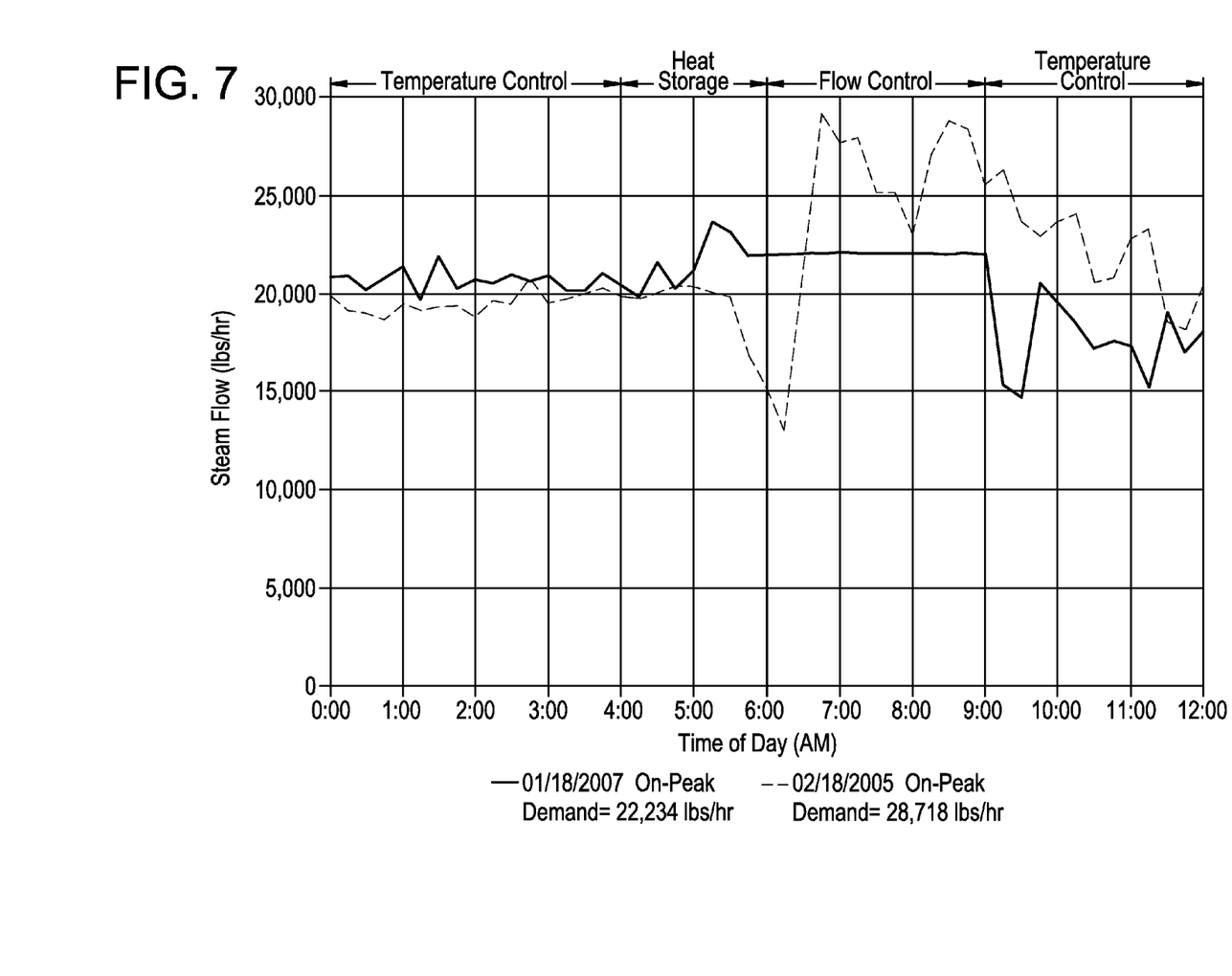
FIG. 7 is an illustration of average steam flow and time curves for a building with and without the flow control mode of FIG. 6A-6C.

FIG. 7 illustrates the steam flow rates used in a high rise commercial office building in New York city both with and without the heating system 20. The prior art system, represented by the dashed-line, shows a decrease in steam flow as the building entered its peak demand period. This decrease is due to the reset of loop temperature from the higher gravity heating temperature of about 180° F. to a lower forced convection temperature of about 120° F. However, this sensible heat is rapidly depleted in less than an hour and is followed by a sharp spike in steam usage which remains higher than that required for heating system 20 from approximately 6:30 AM to 11:30 AM. Since the steam charge from the utility is based on the highest 30 minute usage, the building operator would be charged for the entire peak period based on this spike in usage just before 7 AM. The curve representing heating system 20, the solid line in FIG. 7, enters Constant Flow mode at approximately 5:30 AM, the same point where the prior art system decreased the steam flow. The heating system 20 maintained a constant steam flow rate at approximately 22,000 lb/hr from 5:30 AM to 9:00 AM, the peak demand period of the steam utility. As a result of the use of heating system 20, the building reduced its average on-peak demand from 28,718 lb/hr to 22,234 lb/hr.

The exemplary embodiment describes the heating system 20 with respect to a steam heat source. However, other heating mediums may be used in place of steam. For example, the system 20 and method of operation would be equally applicable to a hydronic system where the heating medium is hot water. In this alternate embodiment, the steam meter 26 would be replaced by a BTU meter and the valve 32 would be modulated to maintain a constant rate of heat input. Accordingly, the heat system 20 may be adapted to any heating source that utilized a heat medium that can be controlled to maintain a constant rate of heat input. Further, the exemplary embodiment describes the building 22 as receiving all of the heating requirements from the utility. However, the building 22 may also incorporate one or more heating subsystems (e.g. boilers) and utilize the utility as a supplementary heat supply during peak demand periods. Further, the use of the heating system 22 would also be advantageous to a building 22 having a self contained heating system (e.g. boilers) since it would allow the installation of a smaller heating system thus decrease the capital costs involved with construction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of heating a building comprising the steps of:
    determining a mode of operation based on the time of day;
    operating in a first mode during a first portion of the day;
    operating in a second mode during a second portion of the day; wherein said first portion of the day is that period of the day preceding a peak load demand time, and said second portion of the day is the peak load demand time period of the day; and
    transmitting a signal to a first valve, said signal indicative of a desired rate of heat input based on increasing a water loop temperature to a high limit when operating in said first mode to store heat in the water loop during the first portion of the day, and said signal indicative of a desired rate of heat source input when operating in said second mode, wherein the desired rate of heat source input is constant in the second mode to reduce peak demand for the heat source input during the second portion of the day.

2. The method of heating a building of claim 1, further comprising the steps of:
    determining an outside ambient temperature;
    determining the day of the week;
    determining said desired rate of heat source input based on said outside ambient temperature.

3. The method of heating a building of claim 2 further comprising the steps of:
    measuring said water loop temperature;
    comparing said water loop temperature to a predetermined first temperature limit; and,
    reducing the rate of heat source input through said first valve if said water loop temperature is greater than said first temperature limit.

4. The method of heating a building of claim 3 further comprising the step of increasing the rate of heat input through a second valve to maintain the rate of heat input through the building at a constant level.

5. The method of heating a building of claim 3 further comprising the steps of:
    comparing said water loop temperature to a predetermined second temperature limit; and,
    controlling said first valve based on said water loop temperature if said water loop temperature is below said second temperature limit.

6. The method of heating a building of claim 5 further comprising the step of comparing said water loop temperature to a third temperature limit, wherein said third temperature limit is between said first and second temperature limits and, closing said first valve if said water loop temperature is above said third temperature limit.

7. The method of heating a building of claim 6 further comprising the step of determining if said water loop temperature is between said first and third temperature limits.

8. The method of heating a building of claim 7 further comprising the step of maintaining a constant rate of heat source input if said water loop temperature is between said first and third temperature limits.

* * * * *